US010025588B1

(12) United States Patent
Tran

(10) Patent No.: US 10,025,588 B1
(45) Date of Patent: Jul. 17, 2018

(54) PARSING OF DATABASE QUERIES CONTAINING CLAUSES SPECIFYING METHODS OF USER-DEFINED DATA TYPES

(75) Inventor: Hoa Thu Tran, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 4855 days.

(21) Appl. No.: 10/303,489

(22) Filed: Nov. 25, 2002

(51) Int. Cl.
*G06F 8/41* (2018.01)
*G06F 8/72* (2018.01)

(52) U.S. Cl.
CPC ................ *G06F 8/72* (2013.01); *G06F 8/443* (2013.01)

(58) Field of Classification Search
USPC ................ 707/1–10, 200–201; 395/601–604
See application file for complete search history.

(56) References Cited

U.S. PATENT DOCUMENTS

| | | | | |
|---|---|---|---|---|
| 5,504,885 | A * | 4/1996 | Alashqur | 717/141 |
| 5,640,584 | A | 6/1997 | Kandasamy et al. | 712/30 |
| 5,812,840 | A * | 9/1998 | Shwartz | 707/4 |
| 5,864,842 | A | 1/1999 | Pederson et al. | 707/3 |
| 5,872,904 | A | 2/1999 | McMillen et al. | 714/4 |
| 5,884,299 | A | 3/1999 | Ramesh et al. | 707/2 |
| 6,278,994 | B1 * | 8/2001 | Fuh et al. | 707/4 |
| 6,353,818 | B1 * | 3/2002 | Carino, Jr. | 707/2 |
| 6,584,459 | B1 * | 6/2003 | Chang et al. | 707/812 |
| 2002/0059069 | A1 * | 5/2002 | Hsu et al. | 704/257 |

OTHER PUBLICATIONS

Schallehn et al. “Advanced Grouping and Aggregation for Data Integration”, by Schellehn, E., Kai-Uwe, S., and Saake, G., Conference on Information and Knowledge Management archive, Proceedings of the tenth international conference on Information and knowledge management, Atlanta, Georgia, USA, pp. 547-549, Year: 2001, ISBN:1-58113-436-3).*

* cited by examiner

*Primary Examiner* — Ashish K Thomas
*Assistant Examiner* — Mellisa M Ohba
(74) *Attorney, Agent, or Firm* — Trop, Pruner & Hu, P.C.

(57) ABSTRACT

A database system includes a parser that is capable of parsing database queries containing user-defined data type (UDT) methods. The database query is transformed by the parser into a statement according to a specified format. In performing the transformation, redundant instantiations of UDTs and invocations of methods are removed. In one implementation, the redundant instantiations and invocations are removed by grouping and combining clauses containing UDT methods.

28 Claims, 2 Drawing Sheets

PARSING OF DATABASE QUERIES CONTAINING CLAUSES SPECIFYING METHODS OF USER-DEFINED DATA TYPES

BACKGROUND

A relational database management system contains relational tables each made up of rows and columns. To extract data from, or to update, a relational table, queries according to a standard database query language (such as the Structured Query Language or SQL) are used.

Examples of SQL statements include INSERT, SELECT, UPDATE, and DELETE. The SELECT statement is used to retrieve information from the database and to organize information for presentation to a user or an application program. The INSERT statement is used to insert a row (or multiple rows) into a table. The DELETE statement is used to delete a row (or multiple rows) from a table. The UPDATE statement is used to modify or change the content of the table. When a SQL query is received by a database system, a parser interprets the query statement, checks the statement for proper SQL syntax, and evaluates it semantically.

Traditionally, a relational database management system stores data according to relatively simple data types, such as the number data type for representing numeric values, character string data type for representing a sequence of characters, and so forth. To enhance the ability to store different types of data, user-defined data types (UDTs) have been introduced. For example, UDTs are provided by SQL: 1999, which is a more recent version of SQL. SQL:1999 defines both predefined data types and UDTs. Predefined data types are the simple data types referred to above that are defined by the database query language itself. On the other hand, UDTs are set by an application, a database management system, or by another standard (other than the database query language standard).

A UDT is also associated with various user-defined methods, which are software routines or modules that can be created by database users for performing various operations on stored data according to the UDT. In addition to user-defined methods that can be created by a database user, UDTs are usually associated with an observer method and a mutator method. The observer method enables the database system to retrieve a UDT attribute value. The mutator method enables the database system to change the value of a UDT attribute.

A UDT method is usually invoked by an SQL query. It is possible to "nest" UDT methods in a query. Nested UDT methods refer to methods that are invoked by another UDT method. In parsing queries that contain nested methods, a conventional parser has to resolve the nesting of methods. This typically entails the re-writing of the query to expressly call out methods that are invoked by other methods. In many cases, the re-writing of a query containing nested UDTs results in an inefficient query that contains redundant instantiations of one or more UDTs and redundant invocations of one or more UDT methods. Redundant instantiations and invocations result in increased processing time for the database query, which causes database system performance to suffer.

SUMMARY

In general, a mechanism to improve the parsing of queries containing user-defined data type (UDT) methods is provided. For example, a process of parsing a database query includes transforming the database query containing a user-defined data type (UDT) method into a statement according to a specified format. In transforming the database query to the statement, redundant instantiations of the UDTs and redundant invocations of methods are removed.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
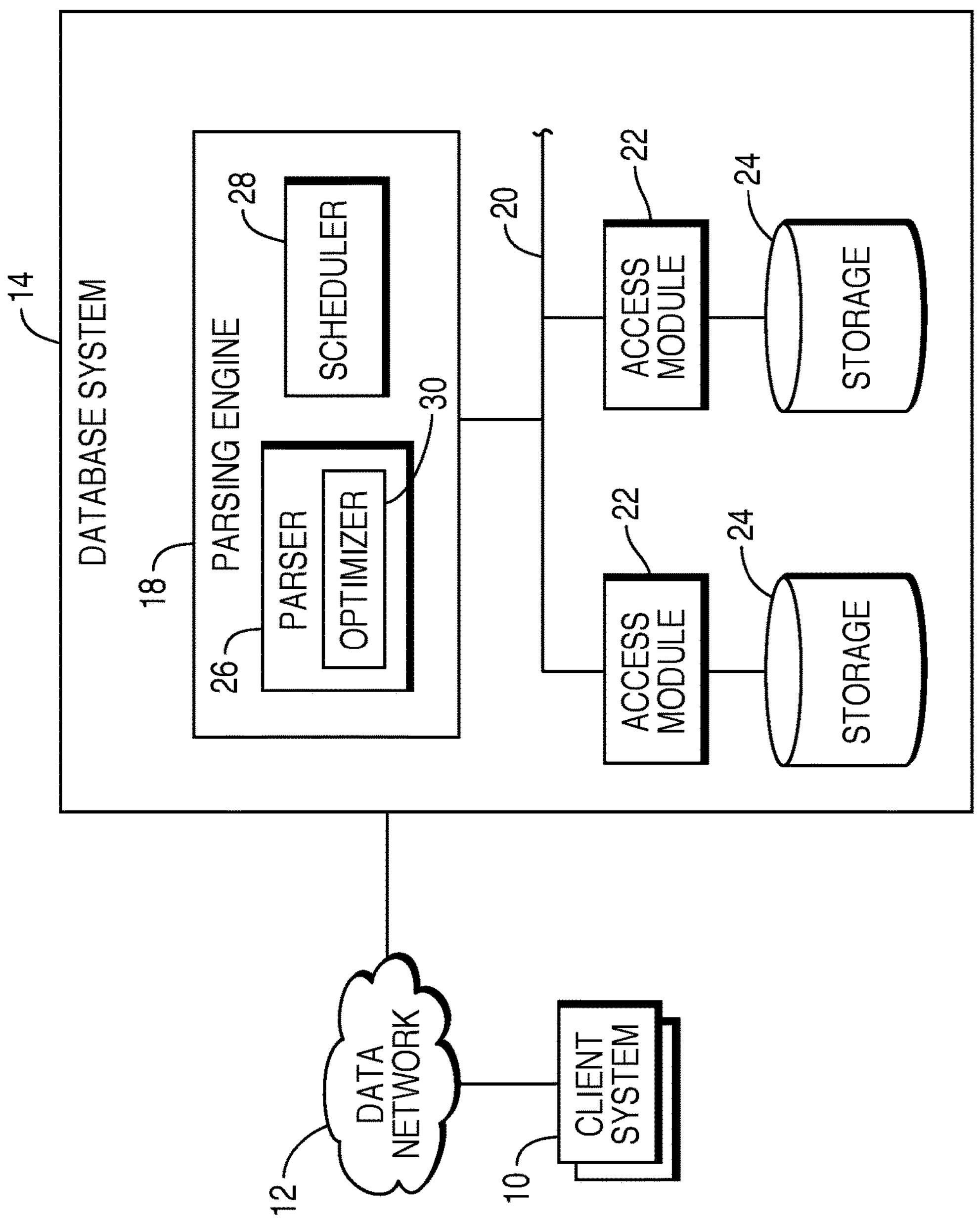
FIG. 1 is a block diagram of an example arrangement of a database system.

FIG. 1 shows a database system 14 that is coupled over a data network 12 to one or more client systems 10. Examples of the data network 12 include a local area network (LAN), a wide area network (WAN), the Internet, and so forth. The client system 10 is capable of issuing queries according to a standard database query language to the database system 14 to access or update data or to create or alter data structures (e.g., tables, rows, and so forth).

One type of standard database query language is the Structured Query Language (SQL), as provided by the American National Standards Institute (ANSI). One version of SQL is SQL:1999 also referred to as the SQL-3 or ISO/IEC 9075: 1999 standards. Although reference is made to SQL:1999 in this discussion, other embodiments employ other types of standard database query languages that provide for user-defined data types (UDTs).

As used here, a "UDT" refers to a data type used in the database system that can be created by a user, an application, a database management system, or another standard (other than the database query language standard). UDTs are contrasted with predefined or built-in data types, which have structures already defined by the standard database query language itself.

Associated with UDTs are user-defined methods, which are software routines or modules that are invoked to process data stored according to a particular UDT. For example, one method that is associated with a UDT is the observer method to retrieve a UDT attribute value. Another method associated with a UDT is the mutator method for changing the value of a UDT attribute. In addition to the observer and mutator methods, user-defined methods can also be created by a user or application.

To extract or update values stored in a relational table, SQL queries are issued to the database system 14. SQL provides for data definition language (DDL) statements that are used to define or modify database structures (such as tables, rows, and so forth). SQL also provides for data manipulation language (DML) statements that are used to manipulate rows and fields of a table. Examples of DML statements include SELECT, DELETE, INSERT, and UPDATE.

In the example arrangement shown in FIG. 1, the database system 14 includes multiple access modules 22 and one or more parsing engines 18. Each access module 22 is responsible for managing access to a respective portion of a database, stored in a respective one of plural storage modules 24. In one embodiment, each access module 22 is based on the access module processor (AMP) used in some TERADATA® database systems from NCR Corporation. The arrangement of the database system 14 shown in FIG. 1 is an example of a parallel database system that has multiple access modules 22 to enable the concurrent processing of stored data (to retrieve or update stored data). In an alternative embodiment, instead of plural access modules, the database system 14 is a uni-processor system.

The parsing engine 18 includes a parser 26 and a scheduler 28. The parser 26 interprets a query (such as a query received from the client system 10), checks the query for proper SQL syntax, and evaluates the query semantically. The parser 26 also includes an optimizer 30 whose role is to develop a least expensive plan (in terms of time and resource usage) to return a requested response set. Alternative plans are evaluated by the optimizer 30 and the least expensive alternative is chosen. The selected plan is converted to executable steps, which are communicated by the scheduler 28 to the access modules 22 for execution.

Although not shown, the database system 14 can be implemented with multiple nodes, each associated with processing hardware (e.g., central processing units and memory) on which the access modules 22 and the parsing engine 18 are executable. Each node in the database system 14 is capable of running more than one access module and/or parsing engine.

In accordance with some embodiments of the invention, the parser 26 provides a more efficient technique for processing queries that contain nested UDT methods. Efficiency is enhanced by removing redundant instantiations of UDTs and redundant invocations of methods during parsing of the queries. This improved technique is described in the context of the UPDATE statement below. However, it should be understood that techniques according to some embodiments can be extended to other types of statements, for example the SET statement in SQL:1999 and the MERGE statement in a later version of SQL. A typical UPDATE statement has the following syntax:

<update statement>::=
UPDATE <table_name>
SET <set clause list>
[ALL|WHERE <condition>|WHERE CURRENT OF <cursor_name>]
<set clause list>::=<set clause>[{<comma> <set clause>} . . . ]
<set clause>::=
<column_name><equals operator><expression>

In the statement above, a table name <table_name> on which the update operation is to be performed is specified. Also provided in the UPDATE statement is a SET statement, which contains a set clause list <set clause list>. The set clause list contains one or more set clauses, each referred to as <set clause>. Each set clause, <set clause>, has the following format: <column_name><equals operator><expression>. An example of a set clause is c=5, where c is <column_name>, the symbol "=" is <equals operator>, and <expression> is "5."

The example provided above is of a query that does not contain UDT attributes (or methods). An UPDATE statement can contain UDT attributes or methods, such as the following:

<mutated set clause update>::=
UPDATE <table_name>
SET <set clause list>
[ALL|WHERE <condition>|WHERE CURRENT OF <cursor_name>]
<set clause list>::=<set clause>[{<comma> <set clause>} . . . ]
<set clause>::=
<column_name><equals operator><expression>
|<mutated set clause><equals operator><expression>
<mutated set clause>::=<mutated target><period><method name>
<mutated target>::=<column_name>|<mutated set clause>

The UPDATE statement provided above is an example format of a mutated set clause update. This statement is referred to as the mutated set clause update because it invokes UDT methods. In the example above, a set clause, <set clause>, contains either <column_name><equals operator><expression> or <mutated set clause><equals operator><expression>. The mutated set clause, <mutated set clause>, is a set clause that invokes a UDT method. The mutated set clause contains the following: <mutated target><period><method name>. The method name, <method name>, is a UDT method, such as a UDT mutator method. The mutated target, <mutated target> is either a column name, <column_name>, or another mutated set clause, <mutated set clause>. Thus, an example of a set clause is as follows: "company.employee=Bob". In this example, the mutated target, <mutated target>, is "company," which is the name of a UDT column. The value "employee" is a mutator method that is invoked to change the value of the "employee" attribute, in this case "Bob."

A mutated set clause, <mutator target><period><method name>, contains nested UDT methods if <mutator target> specifies another mutated set clause. An example of a nested UDT structure is: corporation.company.employee, where the mutated target "corporation.company" is itself a mutated set clause in which the mutated target is "corporation" and the mutator method is "company."

Shortcomings associated with conventional parsers are explained in the context of an example. The following statement creates a "person" UDT, which contains attributes Last_name, First_name, and Birthdate:

```
CREATE TYPE person
AS (Last_name VARCHAR(20),
  First_name VARCHAR(20),
  Birthdate DATE)
NOT FINAL;
```

The following statement creates a "school_record" UDT that contains attributes school_name and GPA:

```
CREATE TYPE school_record
AS (school_name VARCHAR(20),
  GPA FLOAT)
NOT FINAL;
```

The following statement creates a "college_record" UDT, which contains as its attributes school, major, and minor:

```
CREATE TYPE college_record
AS (school school_record,
  major VARCHAR(20),
  minor VARCHAR(20))
NOT FINAL;
```

Note that the attribute school is itself another UDT that is built upon the school_record UDT. Thus, the college_record UDT is built upon the school_record UDT.

The following statement creates a table named "Student_record" that contains the following columns: Student_ID, Student, High_school, and College:

CREATE TABLE Student_record(Student_id integer,
Student person,
High_school school_record,
College college_record);

The Student_id column is according to the integer data type. The Student column is according to the person UDT. The High_school column is according to the school_record UDT. The College column is according to the college_record UDT.

The following example statement updates certain of the attributes defined above in the Student_Record table:

UPDATE Student_record
SET Student_id=12345,
Student.Birthdate='Oct. 12, 1970',
Student.Last_name='Smith',
College.major='Computer Science',
College. School.school_name='UCSD',
College.minor='Math',
Student.First_name='Steven',
College.School.GPA=3.20;

Some conventional parsers will transform the above query into a statement according to a specified format, such as the following:

UPDATE Student_record
SET student_id=12345,
Student=
Student.Birthdate ('Oct. 12, 1970').Last_name ('Smith').First_name ('Steven'),
College=
College.major('Computer Science').School(college.major
('Computer Science').School.school_name ('UCSD')).minor('Math').
School(College.major('Computer Science').School (College.major
('Computer Science').School.school_name ('UCSD')).minor('Math').
School.GPA(3.20));

Note that in this re-written UPDATE statement, multiple redundant instantiations of College and multiple invocations of College.major are required. Also, School.school_name is also invoked redundantly multiple times, as is College.minor. The repeated instantiations of UDTs and invocations of mutator methods above leads to inefficient database operations.

Figure 2:
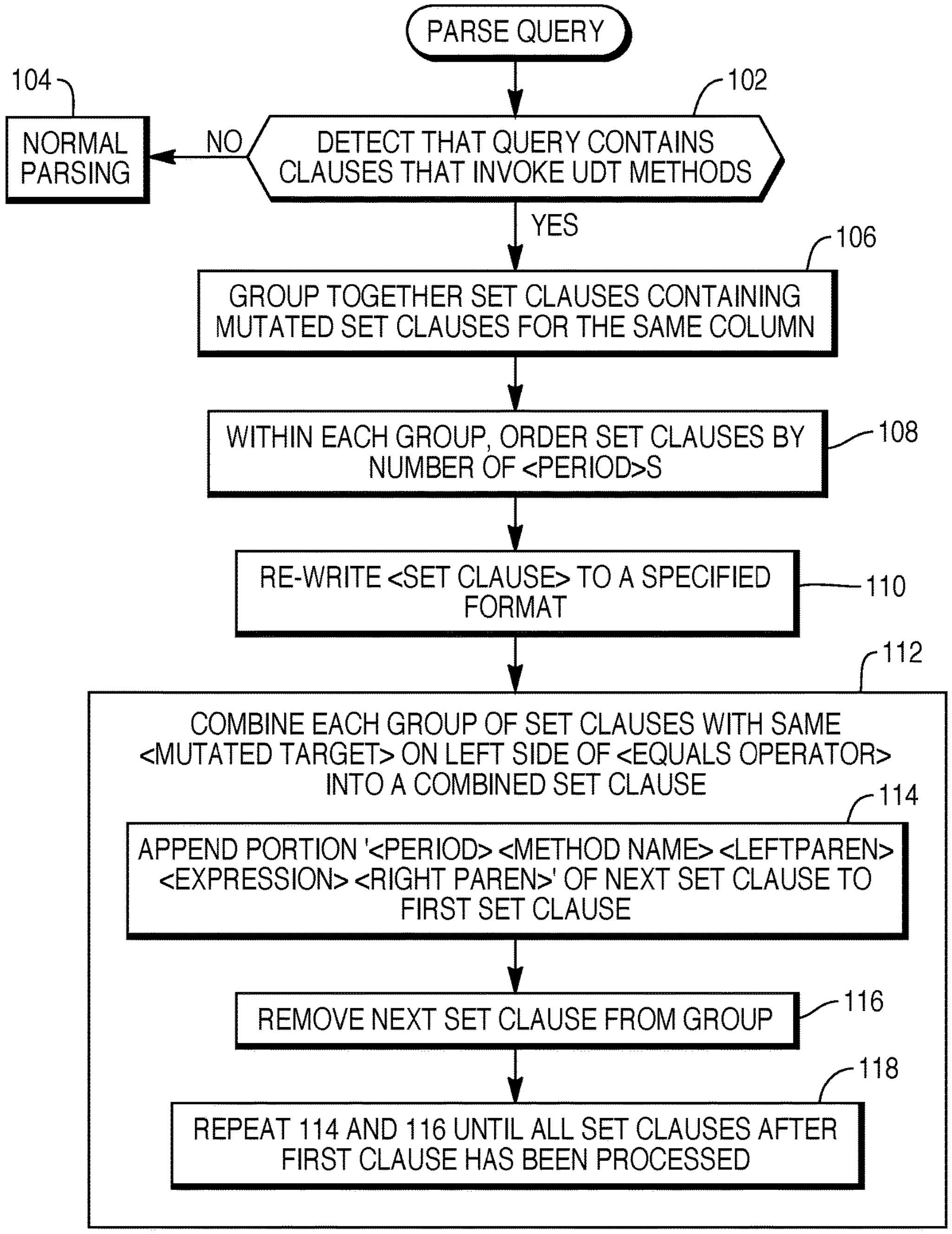
FIG. 2 is a flow diagram of a process for parsing a query according to one embodiment.

In contrast, according to some embodiments of the invention, the parser 26 transforms the original example UPDATE statement into a statement with redundant instantiations of UDT methods removed:

UPDATE Student_record
SET Student_id=12345,
Student=
Student.Birthdate('Oct. 12, 1970').Last_name ('Smith').First_name('Steven'),
College=
College.major('Computer Science').minor('Math').
School(College.school.schoolname('UCSD').GPA (3.20));

FIG. 2 illustrates a flow performed by the parser 26 for processing a database query that contains UDT methods. Generally, the process of FIG. 2 groups, orders, and combines mutated set clauses so that any redundant instantiations of UDTs and redundant invocations of methods are removed. The parser 26 detects (at 102) whether or not the query contains clauses that invoke UDT methods. If the query does not invoke UDT methods, then normal parsing is performed (at 104). However, if the query does invoke UDT methods, the parser 26 groups together (at 106) set clauses that contain mutated set clauses for the same column. For example, the following set clauses for the Student column are grouped together: Student.Birthdate='Oct. 12, 1970'; Student.Last_name='Smith'; and Student.First_name='Steven'.

Within each set clause group (for a given column), the set clauses are ordered (at 108) by the number of <period>s in each set clause from least to most. The number of <periods>s implies the number of method names. For example, College.major='Computer Science' has less <period>s than College.School.GPA='3.20'.

For each <set clause> that contains a <mutated set clause>, the parser 26 re-writes (at 110) the <set clause> that is in the form of <mutated target><period><method name><equals operator><expression> to

<mutated target><equals operator>
<mutated target><period><method name>
<left paren><expression><right paren>

Effectively, the <set clause> is re-written to the specified format given above. Instead of the example format given above, the parser 26 can re-write the <set clause> to other specified formats in other embodiments.

Next, the parser 26 combines (at 112) each group of set clauses with the same <mutated target>. For example, Student.Birthdate='Oct. 12, 1970' and Student.Last_name='Smith' are combined into one set clause because they share the same mutated target. The steps for combining a group of set clauses is as follows. After the first set clause in each group, the parser 26 appends (at 114) the portion '<period><method name><left paren><expression><right paren>' in the next set clause to the first set clause. The next set clause is then removed (at 116) from the group. Acts 114 and 116 are repeated (at 118) until each set clause after the first set clause has been processed.

Next, the parser 26 determines if there is any other set clause that contains a <mutated set clause>. If so, the parser 26 repeats acts 106-118.

The process outlined in FIG. 2 is illustrated with an example. The example UPDATE statement mentioned above is repeated below:

UPDATE Student_record
SET Student_id=12345,
Student.Birthdate='Oct. 12, 1970',
Student.Last_name='Smith',
College.major='Computer Science',
College.School.school_name='UCSD',
College.minor='Math',
Student.First_name='Steven',
College.School.GPA=3.20;

At 106 (FIG. 2), the parser 26 groups together the <set clause>s that contain <mutated set clause>s for the same column. The <set clause>s for columns Student and College are grouped together, as shown below:

UPDATE Student_record
SET Student_id=12345,
Student.Birthdate='Oct. 12, 1970',
Student.Last_name='Smith',
Student.First_name='Steven',
College.major='Computer Science',
College. School.school_name='UCSD',
College.minor='Math',
College.School.GPA=3.20;

At 108, within each set clause group for a column, the parser 26 orders the <set clause>s by the number of <period>s (which implies the number of method names) from least to most. All <set clause>s for the column Student have the same number of periods (one); therefore, no ordering is necessary. The <set clause>s for the column College are ordered so that 'College.major= . . . ' and 'College.minor= . . . ' come before the College.School clauses as follows:

UPDATE Student_record
SET Student_id=12345,
Student.Birthdate='Oct. 12, 1970',
Student.Last_name='Smith',
Student.First_name='Steven',
College.major='Computer Science',
College.minor='Math',
College.School.school_name='UCSD',
College.School.GPA=3.20;

At 110, for each <set clause> that contains a <mutated set clause>, the parser 26 re-writes the <set clause> which is in form of:

<mutated target><period><method name><equals operator><expression> to

<mutated target><equals operator>
<mutated target><period><method name>
<left paren><expression><right paren>

For example, change student.Last_name='Smith' to student=student.Last_name('Smith')

The UPDATE statement now becomes:

UPDATE Student_record
SET Student_id=12345,
Student=Student.Birthdate('Oct. 12, 1970'),
Student=Student.Last_name('Smith'),
Student=Student.First_name('Steven'),
College=College.major('Computer Science'),
College=College.minor('Math'),
College.School=College.School.school_name('UCSD'),
College.School=College.School.GPA(3.20);

At 112, each group of <set clause>s with the same <mutated target> on the left side of the <equals operator> is combined into one <set clause>.

The portion '<period><method name><left paren><expression><right paren>' in the next <set clause> after the first <set clause> is appended (at 114) to the first <set clause>. For example, the following three <set clause>s for the column Student Student=Student.Birthdate('Oct. 12, 1970'),
Student=Student.Last_name('Smith'),
Student=Student.First_name('Steven'), are changed into Student=Student.Birthdate('Oct. 12, 1970').Last_name('Smith'),
Student=Student.Last_name('Smith'),
Student=Student.First_name('Steven'), Next, at 116, the parser 26 removes the second <set clause> from the list. For example, Student=Student.Birthdate('Oct. 12, 1970').Last_name('Smith'),
Student=Student.First_name('Steven'), The above is repeated to combine further set clauses in the same group. The result of combining the <set clause>s for column Student is Student=Student.Birthdate('Oct. 12, 1970').
Last_name('Smith').First_name('Steven'), Finally, for other groups of set clauses, the above is repeated until there is only one <set clause> for each column. At the end of act 112, the UPDATE statement now becomes:

UPDATE Student_record
SET Student_id=12345,
Student=
Student.Birthdate('Oct. 12, 1970').Last_name('Smith').
First_name('Steven'),
College=College.major('Computer Science').minor('Math'),
College.School=College.School.school_name('UCSD').GPA(3.20);

If there still is any <set clause> which contains a <mutated set clause>, the above is repeated. Otherwise, the transformation is completed. Since, the set clause 'College.School= . . . ' still contains a <mutated set clause>, the transformation at 110-112 is repeated.

In this second iteration of acts 110-112, the set clause 'College.School= . . . ' is changed into 'College=College.School( . . . )', as follows:

UPDATE Student_record
SET Student_id=12345,
Student=
Student.Birthdate('Oct. 12, 1970').Last_name('Smith').
First_name('Steven'),
College=College.major('Computer Science').minor('Math'),
College=
College.School(College.School.school_name('UCSD').GPA(3.20));

The second iteration of act 112 combines the two set clauses for the column College into one, as follows:

UPDATE Student_record
SET Student_id=12345,
Student=
Student.Birthdate('Oct. 12, 1970').Last_name('Smith').
First_name('Steven'),
College=
College.major('Computer Science').minor('Math').
School(College.School.school_name('UCSD').GPA(3.20));

Note that by grouping and combining set clauses that contain UDT methods during parsing of a database query, redundant instantiations of the UDTs and redundant invocations of methods are removed. This helps in improving database system performance by reducing the number of UDT instances and method invocations that are required during execution of the query.

The database system discussed above includes various software routines or modules (including software associated with the parser 26 and access modules 22, and so forth). Such software routines or modules are executable on corresponding control modules. The control modules include microprocessors, microcontrollers, or other control or computing devices. As used here, a "controller" or "processor" refers to a hardware component. A "controller" or "processor" can also refer to plural hardware components.

The storage modules referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as compact disks (CDs) or digital video disks (DVDs). Instructions that make up the various software routines or modules in the various systems are stored in respective storage modules. The instructions when executed by a respective control module cause the corresponding system to perform programmed acts.

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A process, executed by at least one processor in a database system, of parsing a database query, comprising:
- transforming, by the at least one processor, the database query containing at least one user-defined data type method into a statement; and
- removing, by the at least one processor, redundant invocations of the at least one user-defined data type method in transforming the database query to the statement.

2. The process of claim 1, wherein transforming the database query comprises transforming a Structured Query Language query.

3. The process of claim 1, wherein the database query contains plural set clauses, the process further comprising combining at least some of the set clauses to remove the redundant invocations.

4. The process of claim 3, wherein combining the at least some of the set clauses comprises combining a group of the set clauses corresponding to a column of a table.

5. The process of claim 3, wherein each set clause has a format Target.Method, the process further comprising combining set clauses containing a common Target value into one combined set clause.

6. The process of claim 5, further comprising deleting a set clause as the set clause is added to the combined set clause.

7. The process of claim 1, wherein removing the redundant invocations comprises removing redundant invocations associated with nested user-defined data type methods in the database query.

8. The process of claim 1, wherein the database query contains plural set clauses, the method further comprising grouping the set clauses according to columns of a table.

9. The process of claim 8, further comprising combining set clauses in each group into a combined set clause.

10. A database system comprising:
- a storage module to store data;
- at least one processor; and
- a parser executable on the at least one processor to:
  - process a query for accessing the data, wherein the query contains at least one user-defined data type routine,
  - transform the query into a statement, and
  - remove redundant invocations of the at least one user-defined data type routine in transforming the query to the statement.

11. The database system of claim 10, wherein the query comprises a Structured Query Language query.

12. The database system of claim 10, wherein the query contains plural set clauses, the parser to further combine at least some of the set clauses to remove the redundant invocations.

13. The database system of claim 12, the parser to combine the at least some of the set clauses by combining a group of the set clauses corresponding to a column of a table.

14. The database system of claim 12, wherein each set clause has a format Target.Method, the parser to further combine set clauses containing a common Target value into one combined set clause.

15. The database system of claim 14, the parser to further delete a given set clause as the given set clause is added to the combined set clause.

16. The database system of claim 10, the parser to remove the redundant invocations by removing redundant invocations associated with nested user-defined data type routines in the query.

17. The database system of claim 10, further comprising an access module to manage access to data stored in the storage module.

18. The database system of claim 17, further comprising at least another access module and another corresponding storage module, the database system comprising a parallel database system.

19. The database system of claim 18, further comprising plural nodes, each node to execute plural access modules and at least one parser.

20. An article comprising at least one non-transitory storage medium containing instructions that when executed cause a database system to:
- receive a database query containing at least one user-defined data type routine;
- parse the database query; and
- remove redundant invocations of the at least one user-defined data type routine as part of the parsing.

21. The article of claim 20, wherein the database query contains plural set clauses, wherein the instructions when executed cause the database system to further combine at least some of the set clauses to remove the redundant invocations.

22. The article of claim 21, wherein the instructions when executed cause the database system to combine the at least some of the set clauses by combining a group of the set clauses corresponding to a column of a table.

23. The article of claim 21, wherein each set clause has a format Target.Method, wherein the instructions when executed cause the database system to further combine set clauses containing a common Target value into one combined set clause.

24. The article of claim 23, wherein the instructions when executed cause the database system to further delete a given set clause as the given set clause is added to the combined set clause.

25. The article of claim 20, wherein the instructions when executed cause the database system to remove the redundant invocations by removing redundant invocations associated with nested user-defined data type routines in the database query.

26. The process of claim 1, further comprising:
receiving a Structured Query Language CREATE TYPE statement to create a user-defined data type (UDT), wherein the at least one user-defined data type method is associated with the UDT.

27. The database system of claim 10, wherein the parser is to further receive a Structured Query Language CREATE TYPE statement to create a user-defined data type (UDT), wherein the at least one user-defined data type routine is associated with the UDT.

28. The process of claim 1, wherein the at least one user-defined data type method is a software routine.

* * * * *